United States Patent [19]
Tick

[11] Patent Number: 5,106,400
[45] Date of Patent: Apr. 21, 1992

[54] CASTING CORE/CLAD GLASS PREFORMS METHOD AND APPARATUS

[75] Inventor: Paul A. Tick, Corning, N.Y.

[73] Assignee: Corning Incorporated, Corning, N.Y.

[21] Appl. No.: 580,161

[22] Filed: Sep. 10, 1990

[51] Int. Cl.$^5$ .............................................. C03B 37/027
[52] U.S. Cl. ....................................... 65/3.11; 65/3.13; 65/13
[58] Field of Search ................... 65/2, 3.11, 13, 3.13

[56] References Cited

U.S. PATENT DOCUMENTS

| | | | |
|---|---|---|---|
| 2,992,517 | 7/1961 | Hicks | 65/3.13 |
| 4,217,123 | 8/1980 | Titchmarsh | 65/3.13 |
| 4,308,045 | 12/1981 | Miller | 65/3.11 |
| 4,453,962 | 6/1984 | Harada et al. | 65/3.13 X |
| 4,897,100 | 1/1990 | Nice | 65/3.13 |
| 4,898,603 | 2/1990 | Hutta | 65/3.11 X |

FOREIGN PATENT DOCUMENTS

2129418 11/1982 United Kingdom .

Primary Examiner—Robert L. Lindsay
Attorney, Agent, or Firm—William J. Simmons, Jr.

[57] ABSTRACT

Disclosed is a method of forming a glass preform from core and cladding glasses having low liquidus viscosities and narrow working ranges. A tube of liquid core glass is vertically situated in a vessel of liquid cladding glass. The tube extends to the bottom of the vessel where there is a stopper for preventing leakage of core glass. While both core and cladding glasses are at a temperature just above the liquidus temperature, the vessel is lowered into a coolant bath, thereby causing core glass to flow into the region vacated by the tube. The rate of withdrawing the tube from the vessel is sufficiently slow to provide laminar flow and yet fast enough to permit the resultant liquid core/clad composite to freeze before mixing occurs.

35 Claims, 4 Drawing Sheets

CASTING CORE/CLAD GLASS PREFORMS METHOD AND APPARATUS

BACKGROUND OF THE INVENTION

The present invention relates to a method and apparatus for forming glass preforms from core glass and cladding glass compositions having narrow working ranges and little resistance to devitrification.

Certain glasses such as halides, chalcogenides, oxyhalides, lead silicates, phosphates, borates and the like, which exhibit narrow working ranges, are difficult to form into fibers. By "narrow working range" is meant that a change in temperature of only a few degrees Centigrade can change the viscosity of a molten glass to such an extent that the glass freezes, i.e. it changes from the liquid to the solid state. Many of these glasses also exhibit low melting point temperatures, and they often readily devitrify, thereby requiring short residence time at elevated temperature to prevent devitrification. Glasses having narrow working ranges are exemplified by those taught in U.S. Pat. Nos. 4,314,031, 4,142,986, 4,405,724, 4,537,864, 4,668,641 and 4,752,593.

Such glasses have generated considerable interest in optical applications such as fibers, lasers and the like. Fluoride glasses, for example, are attractive candidates for transmission optical fibers, because of their low intrinsic scattering loss properties; fluoride glasses can also function as host materials for lasing dopants. However, it has been difficult to form optical fibers, fiber lasers and the like from such glasses. Conventional manufacturing techniques, such as chemical vapor deposition, cannot presently be used to make fluoride glass preforms since suitable precursor compounds have not yet been identified.

Moreover, transmission loss in such glasses can be inordinately high because of thermal compositional fluctuations, phase separation, scattering sites such as crystallites, as well as geometric variations in the size of the fiber core. Conventional techniques for manufacturing fluoride glass preforms produce fibers having these defects.

In accordance with one fabrication method, the fluoride cladding glass melt is poured into a cylindrical container which is rotated to uniformly distribute the cladding glass about the inner surface of the container wall. After the cladding glass has solidified, a rod-shaped region of core glass can be disposed within the cladding glass by pouring a melt of core glass into the cladding glass tube. The inner portion of the cladding glass tube is reheated by the incoming core glass melt. Large crystals can be formed by this reheating of the cladding glass, and these cause scattering in the resultant fiber.

In another technique, a rod-shaped region of core glass and a cladding glass tube are separately cast. The core rod is thereafter placed within the cladding glass tube to form a rod-in-tube preform wherein crystals have not been formed due to reheating the glass. However, fibers drawn from rod-in-tube preforms contain defects at the core-clad interface, which can greatly increase attenuation.

A double crucible method of forming an optical fiber preform is disclosed in U.S. Pat. No. 4,729,777. Inner and outer crucibles are charged with core and cladding glass. After initially being heated to a relatively high temperature, the melts are cooled to a temperature at which they become viscous enough for drawing. When drawing narrow working range glasses by the double crucible method, control of glass flow has been a problem because of the sensitivity of viscosity to temperature. The glass that flows immediately adjacent the core and cladding orifices has a sufficiently long residence time to permit crystallization to begin at the outer surface and at the core/clad interface of the preform. The crystals can then grow later when the preform is drawn into a fiber. That patent states that the method will not cause crystallization of the glass so long as it has a composition of relatively high stability.

In accordance with the teachings of U.S. Pat. No. 4,925,475 a small diameter vessel is located in the top portion of a large diameter vessel. After the vessels are heated to a temperature above 800° C., core glass and cladding glass is loaded into the vessels. After the glasses have been melted, gas begins to cool the outer vessel at a rate such that the inner portion of the cladding glass melt is in the molten state when its outer portion solidifies. When the thickness of the cooled and solidified portion of the cladding glass reaches the desired value, a plug is pulled from the bottom of each vessel. The axial cladding glass region, which is still liquid, runs out, and the core glass melt is simultaneously introduced into the remaining void. This method is disadvantageous in that the solidified cladding glass is reheated by the hot incoming core glass melt, thereby increasing the chance of subsequent crystal growth. Another possible disadvantage of this method is that during the time it takes to drain and refill the core region, additional cooling can occur; this could result in a variation in the core dimensions along the long axis of the preform.

SUMMARY OF THE INVENTION

It is therefore an object of the present invention to provide a method and apparatus for forming core/clad preforms from glass compositions having narrow ranges of working temperatures and a greater tendency toward devitrification than more conventional glasses. Another object is to provide a method and apparatus for forming a preform of readily devitrifiable glass, wherein there are no chords or crystals at the interface between the core and cladding glasses.

Briefly, the method comprises flowing a column of liquid core glass into a quantity of liquid cladding glass while both core and cladding glasses are at a temperature above their liquidus temperatures, and freezing the core and cladding glasses before the onset of crystallization and before the streams begin to mix. The step of flowing may comprise disposing a column of liquid core glass in a vessel of cladding glass having means such as a tube for separating the core and cladding glasses, and withdrawing the separating means from the vessel, whereby core glass comes into contact with the cladding glass. If the vessel is initially disposed in a furnace, the step of freezing can comprise withdrawing the vessel from the furnace while the core glass tube remains stationary in the furnace. As the vessel is withdrawn from the furnace, it can be immersed in a coolant.

In the resultant preform, the core/clad interface is improved since the separating means is removed from its initial position between core and cladding glasses while both glasses are above their liquidus temperatures.

Diameter uniformity of the core portion of the preform can be enhanced by varying the rate at which the tube is withdrawn from the vessel and/or by varying the rate at which core glass flows from the tube.

The vessel can be disposed in a furnace, and the liquid core and cladding glasses can be supplied to the vessel and to the separating means either before or after the vessel is placed in the furnace. Means can be provided for exhausting air from the separating means while liquid core glass is supplied thereto.

The cladding glass can be disposed in a cylindrical vessel, the outer wall of which is formed of metal foil. After the preform is formed during the step of freezing, the foil can be removed from the preform, and the preform can be formed into an article such as an optical fiber.

The apparatus can comprise a cladding glass vessel having a base at one end and an opening at the opposite end. Means is provided for heating the vessel. Separating means such as a tube is disposed in the vessel for retaining a column of liquid core glass and separating the liquid core glass from the liquid cladding glass. Means is provided for withdrawing the tube from the vessel, thereby gradually forming a liquid glass preform, and means is provided for cooling the liquid preform.

In a specific apparatus, the vessel and tube are disposed in a furnace having an opening in one end thereof. Means is provided for preventing the flow of glass from the end of the tube into the vessel when that tube end is adjacent the vessel base. A container of coolant is located adjacent the furnace opening. Means is provided for maintaining the tube in a stationary position in the furnace. Means is provided for withdrawing the vessel from the furnace and immersing the vessel in the coolant, whereby a column of the liquid core glass flows from the tube and into the cladding glass, the composite of the liquid cladding and core glasses being frozen to form the preform.

DESCRIPTION OF THE PREFERRED EMBODIMENTS

The drawings are not intended to indicate scale or relative proportions of the elements shown therein.

Figure 1:
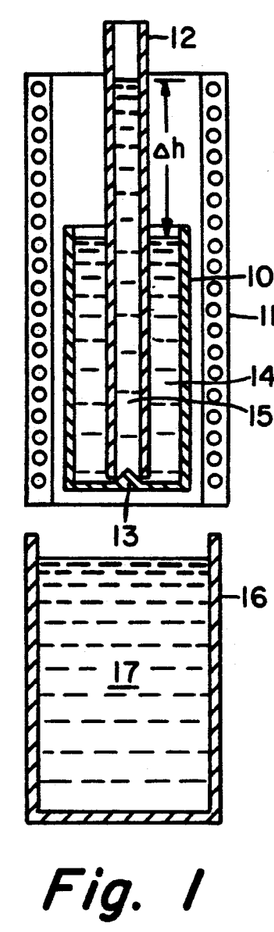
FIGS. 1, 2 and 3 are cross-sectional views schematically illustrating sequential steps of the method of the invention.
Figure 2:
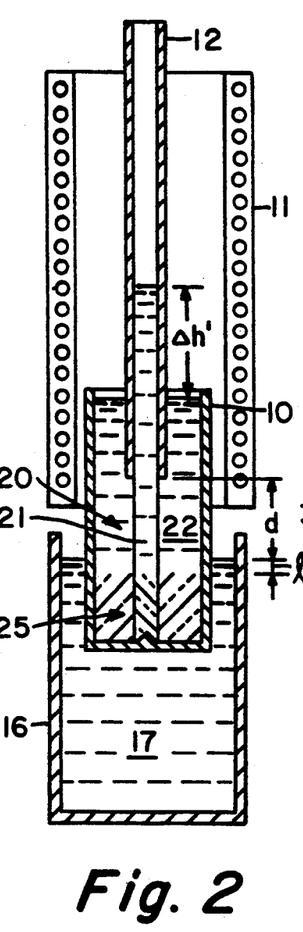
Figure 3:
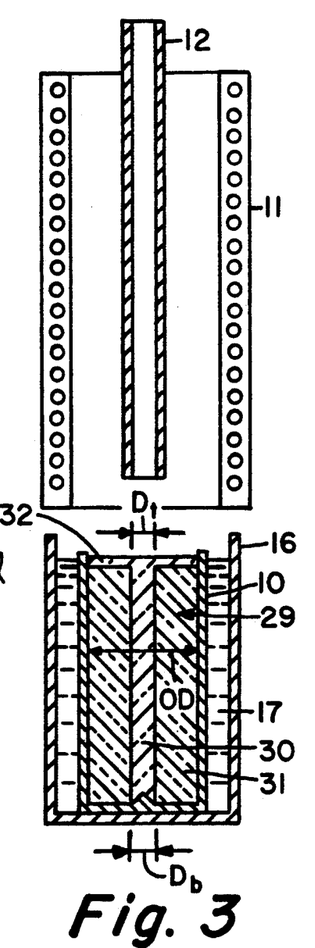
Figure 4:
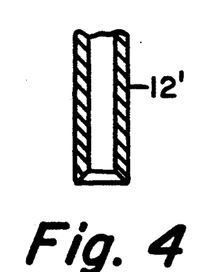
FIG. 4 is a partial cross-sectional view of the end of a core glass tube.
Figures 7, 8, 9:
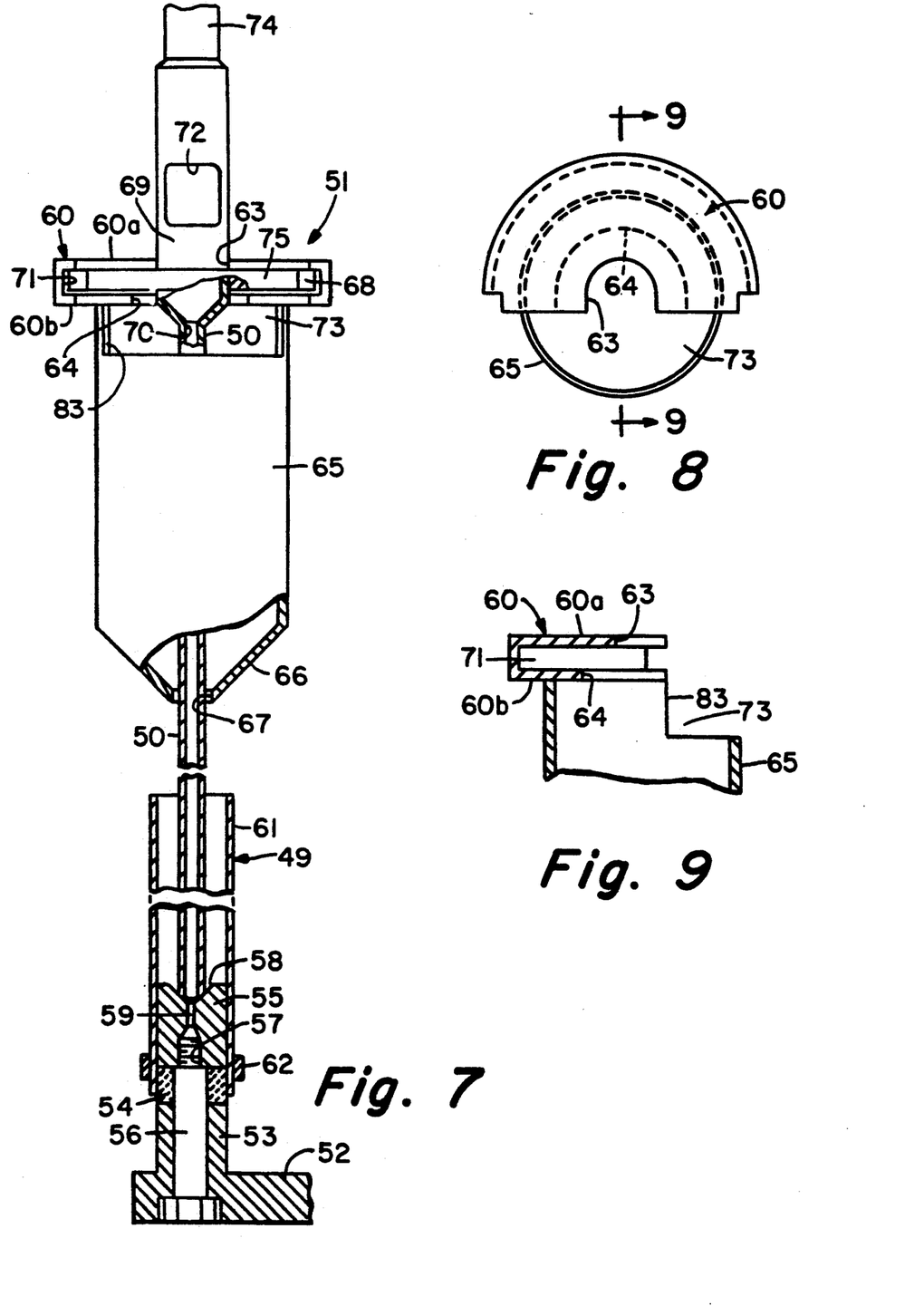
FIG. 7 is an enlarged partial cross-sectional view of a portion of the apparatus of FIG. 6.
FIG. 8 is a plan view of a cladding glass container.
FIG. 9 is a partial cross-sectional view taken at lines 9—9 of FIG. 8.

Referring to FIGS. 1-3, cylindrical vessel 10 is located within furnace 11. Furnace 11 is a vertical tube furnace having a very uniform hot zone. It may be advantageous to use multiple furnace zones to achieve better temperature uniformity. A small diameter tube 12, which is longer than vessel 10, is located within that vessel. FIG. 4 illustrates one type of bevel with which the bottom of tube 12 can be provided to enhance the flow of glass therefrom. Another type of bevel is shown in FIG. 7. Depending upon the type of tube bevel employed, either a protrusion or an indented region can be used to prevent the two liquid glasses from mixing during heatup. Vessel 10 and tube 12 can be formed of material which does not adversely react with liquid glass to be contained therein, i.e. stainless steel, platinum, gold, fused silica, carbon or the like. A further requirement of vessel 10 is that it be easily removable from the glass article after it has cooled. Vessel 10 can be made of thin foil which can be easily separated from the glass preform formed therein. Removal of the vessel from the glass is facilitated by forming vessel 10 from a material the surface of which is not wet by the glass. If the vessel is formed of a low expansion material such as vitreous carbon, the glass will shrink sufficiently upon cooling to separate from the vessel. Protrusion 13 at the bottom of vessel 10 functions as a plug for tube 12 when that tube is forced downwardly thereon. Under furnace 11 is a container 16 that is filled with a coolant 17. The temperature of coolant 17 is preferably held at the minimum temperature that will not thermally shock the core and cladding glasses. The coolant may need to be heated to a temperature above ambient temperature to avoid thermal shock. If the coolant temperature is too high, the slower quenching rate can cause crystallization of the glass to occur.

The coolant can be a liquid such as oil, water, molten metal or the like, or a gas. The type of coolant to be employed depends upon the type of glass that is being formed. If a fast freezing rate is needed, a liquid such as oil or molten metal should be used since liquids are better heat conductors. Examples of suitable liquids are silicone oil, mercury and Wood's metal. A liquid such as water would not be used if the glass temperature is sufficiently high to cause boiling, since the vapor would interfere with the heat transfer process.

U.S. Pat. No. 4,537,864 teaches one type of glass that can be used in the present method. If the cladding glass composition were, in mole percent, 35% $PbF_2$, 10% LiF, 32% $AlF_3$ and 23% $CdF_2$, and the core was a similar glass composition, the liquidus temperature would be about 700° C. The glasses would be heated to about 800° C. to melt and homogenize them, and they could be frozen by immersion in silicone oil that is heated to about 120° C.

Appropriate amounts of core glass and cladding glass are loaded into tube 12 and vessel 10, respectively. To make optical fibers, the refractive index of the core glass should be greater than that of the cladding glass. The glass viscosities that are most suitable for this forming method are very low, some being of the order of poses at the liquidus temperature. For viscosities greater than 500 poises, it may be necessary to pressurize the core glass to cause it to flow at a sufficient rate.

Small differences between the viscosities of the glasses will not adversely affect the process. Also, if the core and cladding compositions have the same or substantially the same density, mixing of the two liquid glasses will be minimized. These viscosity and density relationships are preferred but not mandatory.

Furnace 11 heats the glasses to a temperature above the liquidus temperature, and that temperature is maintained for a sufficient period of time to completely homogenize the glass. The glasses can be agitated to speed up the homogenization process. The temperature of the glasses is lowered to just above their liquidus temperatures, and tube 12 and vessel 10 are carefully separated, a process referred to herein as "the withdrawl process". The withdrawal process can be accomplished by lowering vessel 10, by raising tube 12, or by a combination of these motions. As tube 12 begins to withdraw from vessel 10, there is formed in the bottom of vessel 10 a liquid glass region comprising a core portion 21 and cladding portion 22. Cooling begins at the bottom of vessel 10 and continues upwardly, simultaneously with the withdrawal process. In the embodiment shown, vessel 10 is lowered into coolant 17. Conditions such as rate of withdrawal, tube thickness and tube end bevel are such that laminar flow occurs. If liquid core/clad region 20 is frozen before the liquid core and cladding regions mix, the integrity of the core and the cladding is maintained, and the resulting preform has an intimate, well defined core/clad interface. Separation of the tube 12 and vessel 10 can be made to occur fast enough to freeze the glass before such mixing occurs and yet not create turbulance. Preliminary oil model experiments have shown that the withdrawal rate should be at least about 1 cm/sec for a 5 poise liquid where the dimensions of vessel 10 and tube 12 are as specified below in the discussion of Table 1. The optimal rate of withdrawal depends on the viscosity of the glass and the dimensions of the preform. The time lapse between the formation of the liquid core/clad region and the freezing (solidifying) of that region can be minimized by appropriate design of the apparatus. For example, the coolant must be as close as possible to the bottom of tube 12 at the time that vessel 10 begins to descend. This separation is represented by distance d in FIG. 2. In the apparatus of FIG. 2, distance d can be minimized by bringing coolant container 16 into contact with the bottom of furnace 11. Apparatus can be designed such that the liquid core/clad region begins to freeze in times of the order of a second after vessel 10 begins to descend.

In an alternative apparatus, vessel 10 could be surrounded by one or more cooling chambers of the type taught in U.S. Pat. No. 4,925,475, whereby that vessel could be both heated and cooled while it remained in furnace 11. The furnace is formed of a plurality of zones. Beginning with the lowermost zone, each zone is deenergized and as the core glass tube is withdrawn. As each furnace zone is deenergized, coolant flows around that region of the cladding vessel adjacent the deenergized zone. The liquid core/clad region is thus quickly frozen after it has been formed.

A head $\Delta h$, which initially exists between the upper surfaces of the core and cladding glasses, results in a pressure which affects the rate at which the core glass flows from tube 12 as it is separated from vessel 10. A change in head $\Delta h$ occurs during the withdrawal process because of the rate at which the core glass flows from tube 12 and because of the wall thickness of that tube. In the illustrated embodiment, the head decreases to $\Delta h'$ (FIG. 2) at some intermediate point in the withdrawal process. This decrease in the head causes the diameter $D_b$ of the core glass region at the bottom of the resultant preform to be larger than diameter $D_t$ at the top thereof. FIG. 2 also shows that liquid core/clad region 20 exists for some finite length of time after the adjacent region of vessel 10 has been immersed in coolant 17, whereby liquid region 20 does not freeze and form part of solid region 25 until it has been immersed a distance 1.

After tube 12 has completely separated from vessel 10 and vessel 10 has become sufficiently immersed in bath 17, there is formed a solid preform 29 having a core region 30 and cladding region 31. FIG. 3 shows that an excess of cladding glass will form a layer 32 at the top of preform 29. Similarly, an excessive amount of cladding glass would form a layer at the top of the preform. The end regions containing the indent from protrusion 13 and the excess glass layer 32 are discarded during the fiber drawing process.

The preform outside diameter OD is constant throughout its length. When a fiber is drawn from the preform, the outside diameter of the fiber is maintained substantially constant. Any difference in preform core diameter between the top and bottom portion thereof will cause the resultant fiber to have a varying core diameter. To illustrate the effect of head $\Delta h$ on preform core diameter, the ID/OD ratios of Table 1 were calculated, the following assumptions having been made. The viscosity of the core and cladding glass is 5 poise, and the densities of those glasses is 5 g/cc. The inside diameter of vessel 10 is 1 cm, and its length is 10 cm. The inside diameter of tube 10 is 1 mm, and the outside diameter thereof is 2 mm. The ratios OD/$D_t$ and OD/$D_b$ were calculated for different values of head $\Delta h$ and withdrawal velocity.

TABLE 1

| Initial Head | Separation Velocity (cm/sec) | Ratio of OD to ID | | Time to Exit Furnace (sec) |
| --- | --- | --- | --- | --- |
| | | Bottom | Top | |
| 10 | 0.5 | 16.5 | 14.3 | 19.3 |
| 10 | 1.0 | 23.1 | 18.9 | 9.6 |
| 10 | 2.0 | 32.4 | 26.6 | 4.8 |
| 14 | 0.5 | 15.6 | 13.3 | 19.3 |
| 14 | 1.0 | 22.0 | 18.7 | 9.6 |
| 14 | 2.0 | 30.8 | 26.4 | 4.8 |
| 18 | 0.5 | 15.1 | 13.2 | 19.3 |
| 18 | 1.0 | 21.2 | 18.8 | 9.6 |
| 18 | 2.0 | 29.8 | 25.7 | 4.8 |

The preform core diameters $D_t$ and $D_b$ can be made substantially equal by varying the rate of withdrawal of tube 12 and vessel 10 to compensate for the variable rate at which core glass flows from tube 12 as the head changes. In the embodiment of FIGS. 1-3 a constant diameter core region could be produced by continually decreasing the rate of withdrawal as the distance between the bottom of tube 12 and the bottom of vessel 10 increases.

Figure 5:
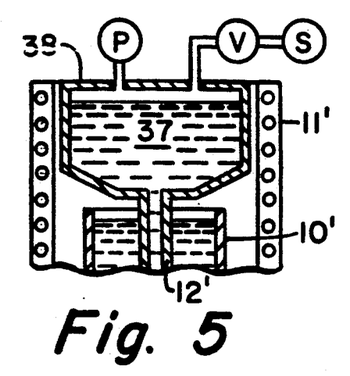
FIG. 5 is a partial cross-sectional view of an alternative apparatus for supplying molten glass.

Alternatively, a substantially constant diameter core region could be formed by varying the rate at which glass flows from tube 12 while employing a constant withdrawal rate. Referring to FIG. 5, tube 12' is supplied with molten core glass 37 from a heated reservoir 38. The cross-sectional area of reservoir 38 with respect to that of tube 12' is sufficiently great that there is very little decrease in the head of core glass 37 as core glass flows from the bottom of pipe 12'. The gas pressure over the glass can be adjusted as the tube is withdrawn to maintain a constant flow from the tube. Valve means (not shown) could shut off the supply of core glass to tube 12' after that tube has been withdrawn from vessel 10'.

Another method of controlling the rate of flow of core glass from the bottom of tube 12' is to control the gas pressure over the surface of core glass 37. Gas is supplied from source S through valve V. Pressure is determined by sensor P and valve V is adjusted to maintain the desired pressure over the glass.

A specific apparatus for carrying out the method schematically illustrated by FIGS. 1-3 is shown in FIGS. 6-9. The apparatus of FIG. 6 includes a tubular furnace 40 having zones 41, 42 and 43, which are axially located within housing 44. The three zones maintain a substantially constant temperature throughout furnace 40 in order to minimize convection in the liquid glasses. Zone 43 is located in a cavity in ceramic insulator 45 which is at the bottom of housing 44. Zones 41 and 42 are surrounded by insulating material 46 which is spaced from housing 44 by an air gap. Cladding glass vessel 49 is situated within the central furnace zone 42, and core glass tube 50 is shown protruding from the upper end of vessel 49. The core and cladding glass feed means 51 is shown at the upper end of tube 50.

That portion of the apparatus comprising vessel 49, tube 50 and feed means 51 is shown in greater detail in FIGS. 7-9. Support arm 52 has an upwardly protruding boss 53. Ring-shaped insulator 54 and vessel base member 55 are vertically aligned above boss 53. Sleeve bolt 56 extends through boss 53 and insulator 54 and is secured to a threaded bore 57 in member 55. The upper surface of member 55 contains a conical depression 58 which is connected to threaded bore 57 by a small diameter orifice 59. Vessel 49 comprises a thin tube 61 of platinum foil or the like which is secured to the bottom of base member 55 by a split ring 62.

Glass feed means 51 comprises an outer container 65 having an inwardly tapering bottom surface 66, the bottom, narrow portion of which contains an opening 67, the diameter of which is larger than the outside diameter of tube 50. A portion of the upper end of container 65 is cut away to form a cladding glass feed opening 73. As shown in FIGS. 8 and 9 container 65 is provided with a cover 60 formed of top portion 60a and bottom portion 60b, the two portions being separated by slot 71. Cover 60 extends only to the vertical wall 83 that forms part of feed opening 73, whereby it does not interfere with the process of loading feed cullet into container 65. Upper cover portion 60a has an opening 63 that is sufficiently large to receive inner container 69. Opening 64 in lower cover portion 60b is larger than opening 63.

Tubular inner container 69 is affixed to upper support arm 74. The bottom surface of container 69 tapers inwardly to an opening 70 which is just large enough to receive the upper end of tube 50. Core glass feed opening 72 is located on one side of container 69. Affixed to the bottom portion of container 69 is a truncated support disk 68, that portion which has been removed forming flat region 75. The thickness of disk 68 is slightly less than the width of slot 71. During assembly of the apparatus of FIG. 7, tube 50 is inserted into feed opening 73 and through opening 67 until support disk 68 becomes aligned with slot 71. Container 65 is then moved angularly with respect to container 69 to cause disk 68 to move into slot 71 until container 69 has fully entered opening 63. Feed opening 72 and flat region 75 of disk 68 are aligned with opening 73.

Figure 6:
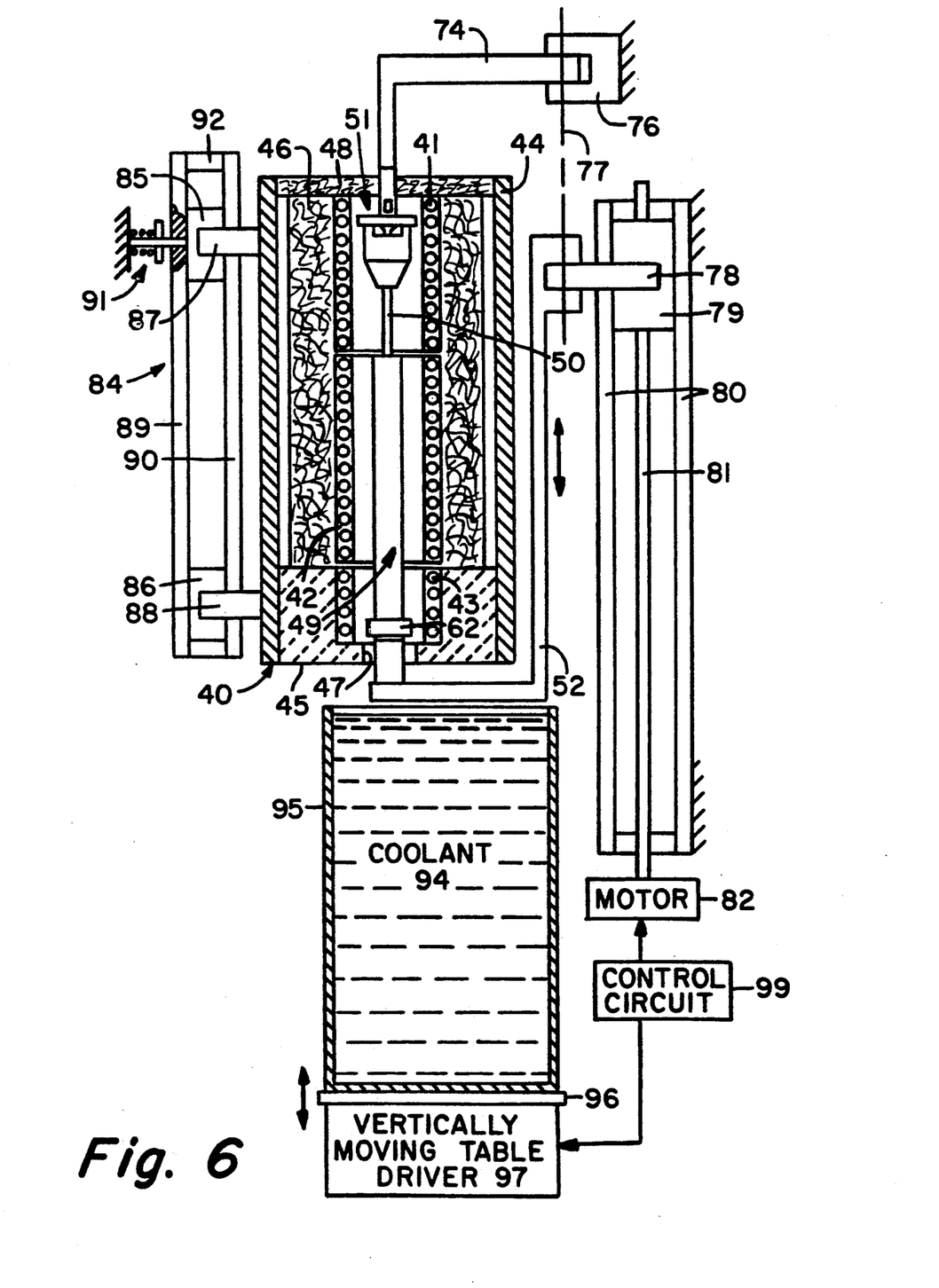
FIG. 6 is a cross-sectional view schematically illustrating a specific apparatus for carrying out the method of the invention.

Referring to FIG. 6, support arm 74 is pivotally mounted to fixed bracket 76. Support arm 52 is pivotally mounted to bracket 78 which is affixed to table 79 which is vertically movable along tracks 80. Table 79 has a vertically oriented threaded bore (not shown) which receives the threaded shaft of motor 82.

Furnace 40 is mounted on a mechanism 84 which permits a limited upward movement of the furnace from its base position which is illustrated. The furnace is connected to two moveable tables 85 and 86 by brackets 87 and 88, respectively. Tables 85 and 86 are free to move upwardly from the illustrated position along tracks 89 and 90. When table 85 contacts the upper motion limiter 92 at the end of tracks 89 and 90, the spring biased pin from detent mechanism 91 slides through track 89 and under table 85, thereby securing that table.

A container 95 filled with coolant 94 is located under furnace 40. Container 95 is situated on a table 96, the vertical position of which is determined by vertically moving table driver 97. Driver 97 may consist of a motor driven scissor mechanism. The opening in the top of container 95 is sufficiently large to receive the lower, horizontally extending portion of support arm 52 as well as vessel 49.

Furnace 40 is preferably split so that one-half thereof pivots on hinges (not shown) such that the remaining half is in the position illustrated in FIG. 6. Support arms 52 and 74 are pivoted about axis 77, thereby retracting the entire mechanism illustrated in FIG. 7 from furnace 40. Weighed amounts of core glass cullet and cladding glass cullet are supplied to inner container 69 and outer container 65 through openings 72 and 73, respectively. Support arms 52 and 74 are again rotated to position the FIG. 6 apparatus axially within furnace 40. The axial opening in cover 48 fits tightly around the upper end of container 69 to prevent furnace updrafts. The remaining furnace half then pivots to the closed position, and is secured.

As soon as the cullet in chambers 69 and 65 melts, it begins to flow. Molten glass in container 69 flows through opening 70 into tube 50. As the melted glass flows to the bottom of tube 50, displaced air flows through bore 59, thereby leaving a bubble-free column of glass within tube 50. Molten cladding glass flows through opening 67, along the outer surface of tube 50 and into vessel 49. The beveled end of tube 50 fits tightly within depression 58 to prevent leakage from occurring. In a proposed embodiment, tube 61 consists of a platinum foil tube having an inside diameter of 0.4 inch (1 cm). The thickness of the foil is 0.002 inch (0.05 mm). The height of tube 61 above base member 55 is 3.9 inch (10 cm). Tube 50 is formed of a platinum rhodium alloy having an inside diameter of 0.04 inch (1 mm), an outside diameter of 0.08 inch (0.2 cm), and a length of 5.56 inches (14.1 cm). The overall height of container 65 is about 3.05 inch (7.7 cm), and its inside diameter is about 1.25 inch (3.2 cm). The overall height of container 69 is about 1 inch (2.54 cm), and its inside diameter is about 0.37 inch (0.9 cm).

After the core and cladding glasses have been melted at a temperature above the liquidus temperature for a period of time sufficient to achieve good homogeneity, control circuit 99 activates table driver 97 to raise table 96 to such an extent that container 95 moves upwardly and contacts the bottom of furnace 40. Further movement of container 95 causes furnace to move upwardly about 2 inches (5 cm), and detent 91 locks table 85. By thus elevating furnace 40, while vessel 49 remains stationary, the distance between vessel 49 and the surface of coolant 94 is decreased. Control circuit 99 then activates motor 82 to lower vessel 49 into container 95. Since the coolant is located immediately below furnace 40, the bottom of vessel 49 is immersed in coolant 94 less than one second after it exits furnace 40.

Figure 10:
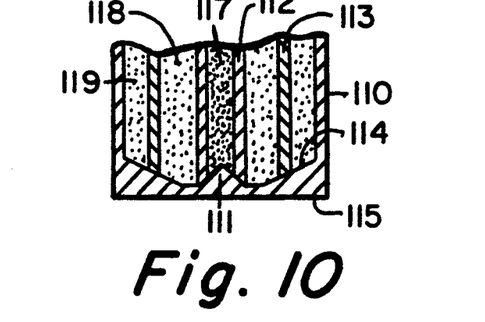
FIG. 10 is a partial cross-sectional view of a modification for forming a preform having three concentric glass regions.

The embodiment of FIG. 10 is capable of forming a glass preform having more than two concentric glass regions. The base of vessel 110 is provided with an axially disposed conical protrusion 111 which receives the bevelled end of centrally located tube 112 in the manner described above. Surrounding tube 112 is a tube 113, the bevelled end of which fits tightly against the bevelled outer region 114 of vessel base 115. Tube 112 is filled with core glass 117. Intermediate cladding glass 118 is located between tubes 112 and 113, and outer cladding glass 119 is located between tube 113 and the outer wall of vessel 110. A preform having three concentric regions is formed by simultaneously separating both tubes from vessel 110 to form a region of three concentric liquid glasses which is quickly frozen as described above.

Figure 11:
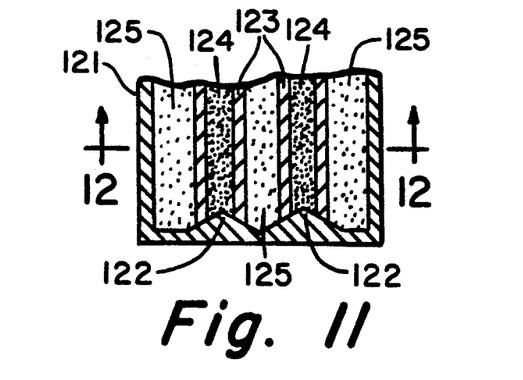
FIG. 11 is a partial cross-sectional view of a modification for forming a preform having a plurality of core regions.
Figure 12:
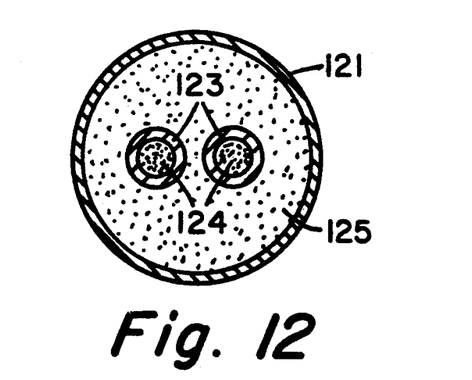
FIG. 12 is a cross-sectional view taken along lines 12—12 of FIG. 11.

A glass preform having two or more core regions can be formed by employing the embodiment of FIG. 11. The base of vessel 121 is provided with two or more conical protrusions 122 which receive the bevelled ends of tubes 123 in the manner described above. Tubes 123 are filled with core glass 124. Cladding glass 125 is located between tubes 123 and the outer wall of vessel 121. A preform having two core regions is formed by simultaneously separating the tubes from vessel 121 to form a region of liquid core and cladding glasses which is quickly frozen as described above. More than two cores can be formed in this manner by employing more than two core tubes 123.

Figure 13:
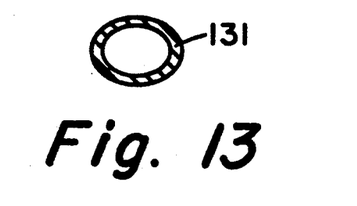
FIG. 13 is a cross-sectional view of a modified core glass tube.

As shown in FIG. 13, the core tubes can be non-circular in cross-section. Tube 131, which is oblong in cross-section, can be used to form a glass preform having a core of oblong cross-section.

I claim:

1. A method of forming a glass optical fiber comprising the steps of
    flowing a column of liquid core glass into a cylindrically-shaped quantity of liquid cladding glass while both core and cladding glasses are at a temperature above their liquidus temperatures, said glasses being readily devitrifiable glasses selected from the group consisting of halides, chalcogenides, oxyhalides, lead silicates, phosphates and borates, which exhibit narrow working ranges, whereby a change in temperature of only a few degrees Centigrade is sufficient to change the glass from the liquid to the solid state, said cylindrically-shaped quantity having a given cross-sectional area,
    freezing said core and cladding glasses before the onset of crystallization and before said streams begin to mix, thereby forming a preform, the cross-sectional area of which is substantially equal to that of said given cross-sectional area, and thereafter drawing a fiber from said preform.

2. A method in accordance with claim 1 wherein the step of flowing comprises
    disposing a column of liquid core glass in a vessel of cladding glass having means for separating said core and cladding glasses, and
    withdrawing said separating means from said vessel, whereby core glass comes into contact with said cladding glass.

3. A method of forming a glass preform comprising the steps of
    flowing a column of liquid core glass into a quantity of liquid cladding glass while both core and cladding glasses are at a temperature above their liquidus temperatures, the step of flowing comprising providing a composite structure comprising a vessel having a tube therein, said vessel having a closed base at one end and an opening at the opposite end, said tube having first and second ends, said first tube end lying adjacent said base, said tube containing liquid core glass, a region within said vessel surrounding said tube containing liquid cladding glass,
    withdrawing said tube from said vessel, whereby incremental liquid preform regions are formed, each liquid preform region comprising liquid core glass surrounded by liquid cladding glass, the interface between said liquid core and cladding glass in said liquid preform region being well defined, the first formed liquid preform region being formed adjacent said base, each subsequently formed liquid preform region being formed on that side of the previously formed liquid region toward said opening, and
    freezing said core and cladding glasses before the onset of crystallization and before said streams begin to mix, the step of freezing comprising cooling that portion of said vessel adjacent said first formed incremental liquid preform region before said core and cladding glasses mix, and thereafter, cooling that portion of said vessel adjacent subsequently formed incremental liquid preform regions before the liquid core and cladding glasses of said subsequently formed liquid preform regions mix.

4. A method of forming a glass preform comprising the steps of
    disposing a column of liquid core glass in a vessel of liquid cladding glass having means for separating said core and cladding glasses,
    withdrawing said separating means from said vessel, whereby core glass comes into contact with said cladding glass, and
    freezing said core and cladding glasses.

5. A method in accordance with claim 4 wherein, during the step of withdrawing, said core glass flows from said separating means at a constant rate.

6. A method in accordance with claim 4 wherein, during the step of withdrawing, said core glass flows into said separating means from a reservoir.

7. A method in accordance with claim 4 wherein the step of disposing comprises positioning said vessel in a furnace.

8. A method in accordance with claim 4 wherein the step of disposing comprises positioning said vessel in a furnace, and thereafter, flowing liquid core glass into said separating means and flowing liquid cladding glass into said vessel.

9. A method in accordance with claim 4 wherein the surface height of said core glass in said separating means is greater than the surface height of said cladding glass in said vessel.

10. A method in accordance with claim 4 wherein the step of disposing comprises positioning said vessel in a furnace, and the step of freezing comprises withdrawing said vessel from said furnace, said separating means remaining stationary in said furnace.

11. A method in accordance with claim 4 wherein the step of withdrawing causes said separating means to vacate incremental regions of said vessel, and the step of freezing comprises cooling said incremental regions as they are vacated by said separating means.

12. A method in accordance with claim 4 wherein the step of withdrawing causes said separating means to vacate incremental regions of said vessel, the step of freezing comprising cooling that portion of said vessel adjacent the first formed incremental liquid preform region before said core and cladding glasses mix, and thereafter, cooling that portion of said vessel adjacent subsequently formed incremental liquid preform regions before the liquid core and cladding glasses of said subsequently formed liquid preform regions mix.

13. A method in accordance with claim 4 wherein the step of freezing comprises immersing said vessel in coolant.

14. A method in accordance with claim 4 wherein the step of freezing comprises moving a container of coolant to a position adjacent said vessel, and thereafter, gradually immersing said vessel in said coolant.

15. A method in accordance with claim 4 wherein the step of disposing comprises disposing said cladding glass in a cylindrical vessel, the outer wall of which is formed of metal foil, and the step of freezing results in the formation of a solid glass preform, said method further comprising the step of removing said foil from said preform.

16. A method of forming a glass article comprising the steps of providing a vessel having a base at one end and an opening at the opposite end, and a tube having first and second ends, said first tube end lying adjacent said base and said second tube end extending beyond said vessel opening, first and second glass melting containers being disposed in close proximity to said vessel, loading core glass into said first container, loading cladding glass into said second container, simultaneously positioning said vessel and said containers in a furnace, the temperature of which is sufficient to melt said core and cladding glasses in said containers, flowing said core and cladding glasses from said first and second containers into said tube and vessel, respectively, withdrawing said vessel from said furnace, said tube remaining stationary in said furnace, whereby a column of said liquid core glass flows from said first end of said tube and into said cladding glass, freezing said core and cladding glasses in said vessel to form a preform, and forming an elongated article from said preform.

17. A method in accordance with claim 16 further comprising the step of exhausting air from the first end of said tube during the step of flowing said core glass therein.

18. A method in accordance with claim 16 wherein the step of forming comprises drawing said preform to form an optical fiber.

19. Apparatus for forming a glass preform comprising a cladding glass vessel having a base at one end and an opening at the opposite end, means for heating said vessel, separating means in said vessel for retaining a column of liquid core glass and separating said core glass from said cladding glass, means for withdrawing said retaining means from said vessel, thereby gradually forming a liquid glass preform, and means for cooling said liquid preform.

20. Apparatus in accordance with claim 19 wherein said cooling means comprises means for cooling that portion of said vessel that has been withdrawn from said separating means.

21. Apparatus in accordance with claim 19 wherein said cooling means comprises a container of coolant adjacent the base of said vessel.

22. Apparatus in accordance with claim 19 wherein said apparatus further comprises means for preventing the flow of liquid core glass from said separating means into said vessel until said separating means begins to withdraw from said vessel.

23. Apparatus in accordance with claim 19 wherein said heating means comprises a furnace having an opening in at least one end thereof, said container of coolant being situated adjacent said furnace opening.

24. Apparatus in accordance with claim 19 further comprising first supply means for supplying said separating means with liquid core glass and second supply means for supplying said vessel with liquid cladding glass.

25. Apparatus in accordance with claim 19 wherein said vessel base includes means for bleeding air from said separating means when liquid core glass is being supplied thereto.

26. Apparatus in accordance with claim 19 further comprising means for moving said coolant container toward said furnace.

27. Apparatus in accordance with claim 19 further comprising means for moving said furnace in a direction away from said coolant container, whereby said coolant container can be positioned immediately adjacent said vessel.

28. Apparatus in accordance with claim 19 further comprising means for simultaneously positioning said first and second supply means, said separating means and said vessel in said furnace.

29. Apparatus in accordance with claim 19 wherein said means for withdrawing comprises means for moving said vessel from said furnace to said coolant container, and means for retaining said separating means in said furnace.

30. Apparatus in accordance with claim 19 wherein said means for withdrawing comprises means for withdrawing said separating means from said vessel at a rate sufficient to cause a column of said liquid core glass to flow into said cladding glass.

31. Apparatus in accordance with claim 19 further comprising a liquid core glass reservoir connected to said separating means.

32. Apparatus in accordance with claim 19 further comprising means for supplying liquid core glass to said separating means at a regulated pressure.

33. Apparatus for forming a glass preform comprising
a furnace having an opening in at least one end thereof, a cladding glass vessel disposed in said furnace, said vessel having a base at one end and an opening at the opposite end, a core glass tube having first and second ends, at least a portion of said tube disposed in said vessel with said second end of said tube adjacent said vessel base, means for preventing the flow of glass from the second end of said tube into said vessel when said second end of said tube is adjacent said vessel base, a container of coolant adjacent that end of said furnace having said opening, means for maintaining said tube in a stationary position in said furnace, and means for withdrawing said vessel from said furnace and immersing said vessel in said coolant, whereby a column of said liquid core glass flows from said tube and into said cladding glass, the composite of said liquid cladding and core glasses being frozen to form said preform.

34. Apparatus in accordance with claim 33 further comprising first and second supply means in said furnace, said first supply means supplying said tube with liquid core glass and second supply means supplying said vessel with liquid cladding glass.

35. Apparatus in accordance with claim 33 further comprising means for simultaneously positioning said vessel and said first and second supply means in said furnace.

* * * * *